(12) United States Patent
Sengupta et al.

(10) Patent No.: US 7,540,965 B2
(45) Date of Patent: Jun. 2, 2009

(54) PROCESS FOR TREATING CONCENTRATED SALT SOLUTIONS CONTAINING DOC

(75) Inventors: Arup K. Sengupta, Bethlehem, PA (US); Ping Li, Bethlehem, PA (US); Brendan J. Murray, Kesington (AU); Stuart D. Harrison, Box Hill North (AU); Gregory M. Vero, Camberwell (AU)

(73) Assignee: Orica Australia Pty Ltd, Melbourne (AU)

( * ) Notice: Subject to any disclaimer, the term of this patent is extended or adjusted under 35 U.S.C. 154(b) by 31 days.

(21) Appl. No.: 10/551,578

(22) PCT Filed: Apr. 2, 2004

(86) PCT No.: PCT/AU2004/000432

§ 371 (c)(1), (2), (4) Date: Oct. 16, 2006

(87) PCT Pub. No.: WO2004/087586

PCT Pub. Date: Oct. 14, 2004

(65) Prior Publication Data

US 2007/0039895 A1    Feb. 22, 2007

(30) Foreign Application Priority Data

Apr. 4, 2003    (AU) .............................. 2003901583

(51) Int. Cl.
*C02F 3/00* (2006.01)
(52) U.S. Cl. .................. 210/661; 210/663; 210/667; 210/670; 210/692
(58) Field of Classification Search ............. 210/661, 210/663, 667, 670, 692
See application file for complete search history.

(56) References Cited

U.S. PATENT DOCUMENTS

| | | | |
|---|---|---|---|
| 1,190,863 | A | 7/1916 | Corne et al. |
| 2,642,514 | A | 6/1953 | Herkenhoff |
| 2,697,724 | A | 12/1954 | Collier |
| 3,560,378 | A | 2/1971 | Weiss et al. |
| 3,808,305 | A | 4/1974 | Gregor |
| 3,996,131 | A | 12/1976 | Conn |
| 4,028,237 | A | 6/1977 | Nishimura et al. |
| 4,049,546 | A | 9/1977 | Rock |
| 4,123,396 | A | 10/1978 | Remnaum et al. |

(Continued)

FOREIGN PATENT DOCUMENTS

AU    52709/79    6/1980

(Continued)

OTHER PUBLICATIONS

Bolto et al. (1985) "Continuous Ion Exchange Using Magnetic Micro-Resins—The Continuous Sirotherm Desalination Demonstration Plant," AWWW 1985 Int. Conf. Proc. :282-288.

(Continued)

*Primary Examiner*—Chester T Barry
(74) *Attorney, Agent, or Firm*—Greenlee, Winner and Sullivan, P.C.

(57) ABSTRACT

A process for removing DOC (dissolved organic carbon) from a concentrated salt solution containing DOC by contacting the salt solution with a coagulant/flocculant such that the DOC becomes insoluble and removing the insoluble DOC from the salt solution.

25 Claims, 2 Drawing Sheets

U.S. PATENT DOCUMENTS

| | | | |
|---|---|---|---|
| 4,154,675 A | 5/1979 | Jowett et al. | |
| 4,207,397 A | 6/1980 | Davis et al. | |
| 4,269,760 A | 5/1981 | Wakimoto et al. | |
| 4,279,756 A | 7/1981 | Weiss et al. | |
| 4,289,617 A | 9/1981 | Davis | |
| 4,303,531 A | 12/1981 | Kawabata et al. | |
| 4,312,956 A | 1/1982 | Chong et al. | |
| 4,314,905 A | 2/1982 | Etzel et al. | |
| 4,329,225 A | 5/1982 | Davis et al. | |
| 4,447,475 A | 5/1984 | Lubbock et al. | |
| 4,473,474 A | 9/1984 | Ostreicher et al. | |
| 4,537,683 A | 8/1985 | Isacoff et al. | |
| 4,632,745 A | 12/1986 | Guiffrida et al. | |
| 4,648,976 A | 3/1987 | Chen | |
| 4,670,154 A | 6/1987 | Carlson et al. | |
| 4,673,504 A | 6/1987 | Ostreicher et al. | |
| 4,693,832 A | 9/1987 | Hurst | |
| 4,702,840 A | 10/1987 | Degen et al. | |
| 4,724,082 A | 2/1988 | Boom | |
| 4,734,200 A | 3/1988 | Berry | |
| 4,737,921 A | 4/1988 | Goldwasser et al. | |
| 4,804,465 A | 2/1989 | Brown | |
| 4,806,244 A | 2/1989 | Guilhem | |
| 4,808,316 A | 2/1989 | Otomura et al. | |
| 4,828,715 A * | 5/1989 | Sander et al. | 210/710 |
| 4,839,057 A | 6/1989 | White | |
| 4,935,450 A | 6/1990 | Cone, Jr. | |
| 4,952,386 A | 8/1990 | Davison et al. | |
| 4,956,061 A | 9/1990 | Dempsey et al. | |
| 5,043,072 A | 8/1991 | Hitotsuyanagi et al. | |
| 5,120,688 A | 6/1992 | Hsieh | |
| 5,128,041 A | 7/1992 | Degen et al. | |
| 5,143,583 A | 9/1992 | Marchessault et al. | |
| 5,149,437 A | 9/1992 | Wilkinson et al. | |
| 5,152,896 A | 10/1992 | Mazet et al. | |
| 5,182,023 A | 1/1993 | O'Connor et al. | |
| 5,215,632 A | 6/1993 | Fritts et al. | |
| 5,236,595 A | 8/1993 | Wang et al. | |
| 5,248,424 A | 9/1993 | Cote et al. | |
| 5,254,257 A | 10/1993 | Brigano et al. | |
| 5,320,756 A | 6/1994 | Winston | |
| 5,364,534 A | 11/1994 | Anselme et al. | |
| 5,403,495 A | 4/1995 | Kust et al. | |
| 5,449,522 A | 9/1995 | Hill | |
| 5,464,530 A | 11/1995 | Stivers | |
| 5,494,582 A | 2/1996 | Goodman | |
| 5,547,585 A | 8/1996 | Shepherd et al. | |
| 5,595,666 A | 1/1997 | Kochen et al. | |
| 5,639,377 A | 6/1997 | Banham et al. | |
| 5,707,514 A | 1/1998 | Yamasaki et al. | |
| 5,728,302 A | 3/1998 | Connor et al. | |
| 5,772,891 A | 6/1998 | Yamasaki et al. | |
| 5,855,790 A | 1/1999 | Bradbury et al. | |
| 5,876,685 A | 3/1999 | Krulik et al. | |
| 5,900,146 A | 5/1999 | Ballard et al. | |
| 5,932,099 A | 8/1999 | Cote et al. | |
| 6,020,210 A | 2/2000 | Miltenyi | |
| 6,027,649 A | 2/2000 | Benedek et al. | |
| 6,045,694 A | 4/2000 | Wang et al. | |
| 6,110,375 A | 8/2000 | Bacchus et al. | |
| 6,120,688 A | 9/2000 | Daly et al. | |
| 6,143,717 A | 11/2000 | Hill | |
| 6,171,487 B1 | 1/2001 | Rousseau et al. | |
| 6,171,489 B1 | 1/2001 | Ballard et al. | |
| 6,197,193 B1 | 3/2001 | Archer | |
| 6,200,471 B1 | 3/2001 | Nohren | |
| 6,203,705 B1 | 3/2001 | James et al. | |
| 6,267,892 B1 | 7/2001 | Wada et al. | |
| 6,338,803 B1 | 1/2002 | Campbell et al. | |
| 6,355,221 B1 | 3/2002 | Rappas | |
| 6,372,143 B1 | 4/2002 | Bradley | |
| 6,375,848 B1 | 4/2002 | Cote et al. | |
| 6,416,668 B1 | 7/2002 | Al-Samadi | |
| 6,436,297 B1 | 8/2002 | Lebeau et al. | |
| 6,461,514 B1 | 10/2002 | Al-Samadi | |
| 6,464,881 B2 | 10/2002 | Thoraval | |
| 6,491,827 B1 | 12/2002 | Temple et al. | |
| 6,517,723 B1 | 2/2003 | Daigger et al. | |
| 6,565,748 B1 | 5/2003 | Wang et al. | |
| 6,613,232 B2 | 9/2003 | Chesner et al. | |
| 6,669,849 B1 * | 12/2003 | Nguyen et al. | 210/638 |
| 6,776,913 B1 | 8/2004 | Jangbarwala | |
| 6,777,454 B2 | 8/2004 | Ritchie et al. | |
| 6,783,681 B2 | 8/2004 | Mueller et al. | |
| 6,824,685 B2 | 11/2004 | Katsu et al. | |
| 6,864,397 B2 | 3/2005 | Kondo et al. | |
| 6,926,832 B2 | 8/2005 | Collins et al. | |
| 6,954,738 B2 | 10/2005 | Wang et al. | |
| 6,982,037 B2 | 1/2006 | Horng et al. | |
| 6,998,054 B2 | 2/2006 | Jangbarwala et al. | |
| 7,025,884 B2 | 4/2006 | Mueller et al. | |
| 2002/0106659 A1 | 8/2002 | Karlou-Eyrisch et al. | |
| 2004/0050785 A1 | 3/2004 | Nguyen et al. | |
| 2004/0094485 A1 * | 5/2004 | O'Leary | 210/723 |
| 2004/0140266 A1 | 7/2004 | Nguyen et al. | |
| 2005/0124707 A1 | 6/2005 | Eldridge et al. | |
| 2005/0224413 A1 | 10/2005 | Nguyen et al. | |
| 2005/0274674 A1 | 12/2005 | Meuller et al. | |
| 2006/0011550 A1 | 1/2006 | Bourke et al. | |

FOREIGN PATENT DOCUMENTS

| | | |
|---|---|---|
| AU | 6053080 | 11/1980 |
| AU | 704376 | 4/1999 |
| AU | 705434 | 5/1999 |
| AU | 744706 | 2/2002 |
| AU | 749656 | 6/2002 |
| DE | 3938245 | 5/1991 |
| EP | 0117096 | 8/1984 |
| EP | 0522856 | 1/1993 |
| EP | 0540485 | 5/1996 |
| EP | 0605826 | 8/1997 |
| EP | 0779899 | 2/2000 |
| EP | 0781255 | 7/2000 |
| EP | 1303566 | 4/2003 |
| GB | 1559809 | 1/1980 |
| GB | 2273701 | 6/1994 |
| JP | 59049851 | 3/1984 |
| JP | 60132609 | 7/1985 |
| JP | 62141071 | 6/1987 |
| JP | 6102709 | 4/1994 |
| JP | 09047761 | 2/1997 |
| JP | 11309354 | 11/1999 |
| WO | 9321114 | 10/1993 |
| WO | 94/00237 | 1/1994 |
| WO | 9607615 | 3/1996 |
| WO | 9607675 | 3/1996 |
| WO | 9851622 | 11/1998 |
| WO | 9947456 | 9/1999 |
| WO | 0244091 | 6/2002 |
| WO | 03057739 | 7/2003 |
| WO | 03082748 | 10/2003 |
| WO | 2004087586 | 10/2004 |

OTHER PUBLICATIONS

Bursill et al. (1985) "The Effect of Natural Organics on Water Treatment," AWWA 11th Federal Conv. :197-204.

Chriswell et al. (1977) "Comparison of Macroreticular Resin and Activated Carbon as Sorbents," J. AWWW Dec. :669-674.

Derwent Abstract Accession No. 91-255202/35, HU T0056044A, Vilamosenergiaipari ki, Jul. 29, 1991.

Galjaard et al. (2002) "Enhanced Pre-Coat Engineering (EPCE) for MF and UF: Steps to Full-Scale Application," Proc. IWA, ISSSN 0941-0961.

Laine et al. (2002) "Understanding Membrane Fouling: A Review of Over a Decade of Research," Proc. IWA, ISSN 0941-0961.

Lee et al. (2002) "Determination of Mass Transport Characteristics for Natural Organic Matter (NOM) in Ultrafiltration (UF) and Nanofiltration (NF) Membranes," Water Sci and Technol. 2(2):151-160.

Rook et al. (1979) "Removal of Trihalomethane Precursors from Surface Waters Using Weal Base Resins," Water Technol. Quality J. :520-524.

Shim et al. (2002) "Effects of Natural Organic Matter and Ionic Strength on Membrane Surface Charge," J. Environmental Sci Technol. 366(17):3864-3871.

Swinton et al. (1983) "Continuous Ion Exchange Using Magnetic Microbeads—Field Trials of a Transportable Pilot Plant," AWWW 10th Federal Convention 30-1-30-14.

Symons et al. (1992) "The Use of Anion Exchange Resins for the Removal of Natural Organic Matter from Municipal Water," International Water Conference Water Conference, Proceedings Book :92-120.

Tilsley et al. (1978) "Ion Exchange in the Water Industry—Interaction of Organic Matter with Anion Resins," Chem. Industry :142-149.

Amiad Turbocelan Filters, http://www.amiadusa.com , Non dated.

Amy et al. (1999) "Interactions Between Natural Organic Matter (NOM) and Membranes: Rejection and Fouling," Water Sci Technol. 40(9):131-139.

Ariza et al. (2002) "Effect of pH on Electrokinetic and Electrochemical Parameter of Both Sub-Layers of Composite Polyamide/Polysulfone Membranes," Desalination 148:377-382.

Bourke et al. (Apr. 1999) "Scale-up of the MIEX DOC Process for Full Scale Water Treatment Plants," Water Corporation of WA., 18th Federal Convention, Australian Water, and Wastewater Association, Proceedings 11-14, Adelaide Australia.

Brattebo et al. (1987) "Ion Exchange for the Removal of Humic Acids in Water Treatment," Wat. Res. 21(9):1045-1052.

Brown et al. (1974) "Anion Exchange Resin Performance in the Treatment of River Trent Water," Effluent Water Treat. J. 14:417-422.

Chai et al. (1998) "Charged Polyacrylonitrile Membranes Having Amphiphilic Quaternized Ammonium Groups for Ultrafiltration," Appl. Poly. Sci. 69(9):1821-1828.

Childress et al. (2000) "Relating Nanofiltration Membrane Performance to Membrane Charge (Electrokinetic) Characteristics," Environ. Sci. Technol. 34:3710-3716.

Cho et al. (2000) "Membrane Filtration of Natural Organic Matter: Comparison of Flux Decline, NOM Rejection, and Foulants During Filtration with Three UF Membranes," Desalination 127:283-298.

Cho et al. (2000) "Membrane Filtration of Natural Organic Matter: Factors and Mechanisms Affecting Rejection and Flux Decline with Charged Ultra Filtration (UF)," J. Memb. Sci. 164:89-110.

Cho et al. (1998) "Characterization of Clean and Natural Organic Matter (NOM) Fouled NF and UF Membranes, and Foulants Characterization," Desalination 118:101-108.

Christy et al. (2002) "High-Performance Tangential Flow Filtration: A Highly Selective Membrane Separation Process," Desalination 144:133-136.

Derwent Abstract Accession No. 86-281075/43, JP 61-204080A, Tokuyama Soda KK, Sep. 10, 1986.

Derwent Abstract Accession No. 92-288534/35, JP 04-197435, Sumitomo Chem. Co Ltd, Jul. 17. 1992.

Drikas et al. (Non dated) "Operating the Miex Process With Microfiltration of Coagulation."

Drikas et al. (2002) "Removal of Natural Organic Matter—A Fresh Approach," Water Sci. Technol. 2(1):71-79.

Eldridge, R.J. (1995) "Moving-Bed Ion Exchange with Magnetic Resins," Rev. Chem. Eng. 11(3):185-228.

Feed Materials Production Center (Non dated) "Potential Exposure Pathways," http://www.atsdr.cdc.gov/HAC/PHA/fer/fer_p2d.html.

Fu et al. (1989) "Mechanistic Interactions of Aquatic Organic Substances with Anion-Exchange Resins," Aquatic Humic Resources, Am. Chem. Soc. :797-811.

Galjaard et al. (2005) "Influence of NOM and Membrane Surface Charge on UF-Membrane Fouling," http://www.iwaponline.com/wio/2005/04/wio200504001.htm.

Hach Webpage (Downloaded Jan. 5, 2006) Browse by Parameter, Test for: copper, http://www.hach.com.

Hach webpage (Downloaded Jan. 5, 2006) DR/4000 Procedure, Methods8506 and Method 8026, http://www.hach.com.

Harries et al. (1984) "Anion Exchange in High Flow Rate Mixed Beds," Effluent Water Treatment J. 24:131-139.

Hongve, D. (1989) "Anion Exchange for Removal of Humus from Drinking Water. Calcium Improves the Efficiency of the Process," Water Res. 23(11):1451-1454.

Kaiya et al. (2000) "Analysis of Organic Matter Causing Membrane Fouling in Drinking Water Treatment," Water Sci. Technol. 41(10-11):59-67.

Kavitskaya et al. (2003) "Adsorption of Anionic Surface Active Substances(SAS) on Charged Membranes," Desalination 158:225-230.

Kim et al. (Dec. 1991) "Using Anion Exchange Resins to Remove THM Precursors," Research and Technology J. AWWA 83:61-68.

Kim et al. (2003) "Evaluation of UF Membranes for Effective Effluent Organic Matter (EfOM) Removal with Hydrophilic Polymer Additives," AWWA Membrane Technology Conference.

Kunin et al. (1980) "Removal of Humic Material from Drinking Water by Anion Exchange Resins," Activated Carbon Absorption of Organics from the Aqueous Phase, vol. 2, Ann Arbor Science, Ann Arbor, pp. 425-441.

Lee et al. (2001) "Cleaning Strategies for Flux Recovery of An Ultra Filtration Membrane Fouled by Natural Organic Matter," Water. Resources 35(14):3301-3308.

Miex DOC US Technical Brochure, Downloaded Jan. 5, 2006, http://www.miexresin.com.

Morran et al. (non dated) "Miex and Microfiltration—A Winning Alliance."

Morran et al. (1996) "A New Technique for the Removal of Natural Organic Matter," AWWA Watertec Convention, Sydney.

Morran et al. (Mar. 1997) "A Simple Method to Reduce Disinfection By-Product Formation," 17th Federal Convention, Australian Water and Wastewater Convention, Proceedings 16-21, Melbourne Australia, pp. 373-379.

Mysels, K.J. (1959) Introduction to Colloid Chemistry, Interscience Publishers, New York, pp. 345.

Naumczyk et al. (1989) "Organics Isolation from Fresh Drinking Waters by Macroporous Anion-Exchange Resins," Water Res. 23(12):1593-1597.

Nguyen et al. (Mar. 1997) "DOC Removal by Miex Process, Scaling-up and Other Development Issues," 17th Federal Convention, Australian Wastewater Association, Proceedings 16-21, Melbourne Australia, pp. 373-379.

Odegaard et al. (1989) "Removal of Humic Substances by Ion Exchange," Aquatic Humic Resources, Am. Chem. Soc. :813-834.

Slunjski et al. (Apr. 1999) "Miex DOC Process—A New Ion Exchange Process," Australian Water Quality Centre, 18th Federal Convention, Australian Water and Wastewater Association, Proceedings 11-14, Adelaide Australia.

Stone et al. (1993) "Charged Micropourous Membranes," Microelectronics Applications Notes.

Thurman et al. (1989) "Separation of Humic Substances and Anionic Surfactants from Ground Water by Selective Absorption," Aquatic Humic Substances: Influence on Fate and Transformation of Pollutants, American Chemical Society :107-114.

van Breemen et al. (1979) "The Fate of Fluvic Acids During Water Treatment," Wat. Res. 13:771-779.

Wlimelech et al. (1996) Water treatment Technology Program Report No. 10, December, U.S. Department of the Interior, Bureau of Reclamation.

Xenopoulos et al. (2003) Abstract from the Meeting of the North American Membrane Society, Biomedical Applications/Bioseparations section of May 19, 2003, http://www.che.utoledo.edu/nams/2003/viewpaper.cfm?ID=426, accessed May 28, 2004.

* cited by examiner

PROCESS FOR TREATING CONCENTRATED SALT SOLUTIONS CONTAINING DOC

CROSS-REFERENCE TO RELATED APPLICATIONS

This application is the National Stage of International Application No. PCT/AU2004/000432, filed Apr. 2, 2004, which claims priority to the Australian patent application number 2003901583, filed Apr. 4, 2003, both of which are hereby incorporated by reference to the extent not inconsistent with the disclosure hereof.

FIELD OF THE INVENTION

The present invention relates to the field of water treatment, and in particular, to plant scale water treatment processes which utilize or generate concentrated salt solutions. The invention particularly relates to a process for treating concentrated salt solutions which contain dissolved organic carbon. Such solutions may be generated in plant scale water treatment processes as a by-product from the process of regenerating ion-exchange resins or as a by-product from processing raw water by membrane filtration processes. For convenience, the invention will be described with reference to the treatment of raw water to produce potable water for distribution and consumption, however, it is to be understood that the invention may also be used in other industrial applications, such as in the treatment of sewage and effluent from industrial processes.

BACKGROUND OF THE INVENTION

The processes used in water treatment depend largely on the nature of the raw water. Water supplies which feed industrial plants for the production of potable water for distribution and consumption, often contain unacceptably high levels of dissolved, dispersed or suspended organic compounds and materials. Most organic compounds and materials found in raw water supplies are natural organic matter (NOM). A fraction of the NOM in the raw water supply is represented by dissolved organic compounds which present particular difficulties. These organic compounds referred to as dissolved organic carbon (DOC), are one of the main causes of water discoloration. DOC often includes compounds such as humic and fulvic acids which are water-soluble at certain water pH levels. Humic and fulvic acids are not discrete organic compounds but mixtures of organic compounds formed by the degradation of plant residues.

The removal of DOC from water is necessary in order to provide high quality water suitable for distribution and consumption. A majority of the compounds and materials which constitute DOC are soluble and not readily separable from the water. The DOC present in raw water renders conventional treatment difficult and expensive.

The production of safe potable water from a raw water supply often requires treatment of water to make it aesthetically acceptable, as well as being safe to drink. The removal of suspended matter and DOC is an important aspect of this treatment.

The removal of DOC in water treatment plants can be facilitated by many processes including the use of membrane filtration processes like nanofiltration and reverse osmosis. Depending upon the composition of the raw water and the membrane itself such processes are able to remove up to and greater than 90% of DOC. However, apart from removing DOC, these processes are also able to remove salts contained within the raw water including NaCl. They are also used in desalination of seawater and brackish water. The end result of such processes is the collection of concentrated mixtures of DOC and salts which are rejected by the membrane and tends to foul them causing them to be less effective over time. As can be imagined this process produces a substantial amount of waste DOC and salt mixtures which are ultimately disposed of to land application or discharged into the ocean.

Of growing importance in water treatment technology is the use of ion-exchange resins, which can be used for removing DOC from raw water. Ion-exchange techniques conventionally involve passing water through a packed bed or column of ion-exchange resin. Target species (DOC) are removed by being adsorbed onto the ion-exchange resin. Ion-exchange resins can be used to remove up to 90% of the DOC in raw water.

Ion-exchange resins may also be used in conjunction with other methods of water purification. Sufficient resin may be added to remove a percentage of the DOC such that the cost of any subsequent treatment used to meet water quality objectives is minimized. For example, the use of ion-exchange resin for the removal of DOC can facilitate the reduction of the amount of coagulant required to achieve acceptable product water quality.

Ion-exchange resin may also aid in significantly reducing the capital and operating costs of membrane filtration.

In order to further minimize costs in water processing, ion-exchange resins are preferably recyclable and regenerable. Recyclable resins can be used multiple times without regeneration and continue to be effective in adsorbing DOC. Regenerable resins are capable of being treated to remove adsorbed DOC, and as such, these regenerated resins can be reintroduced into the treatment process.

Ion-exchange resins incorporating dispersed magnetic particles (magnetic ion-exchange resins) readily agglomerate due to the magnetic attractive forces between them. This property renders them particularly useful as recyclable resins as the agglomerated particles are more readily removable from the water. A particularly useful magnetic ion-exchange resin for the treatment of raw water is described in WO96/07675, the entire contents of which is incorporated herein by reference. The resin disclosed in this document has magnetic particles dispersed throughout the polymeric beads such that even when they become worn through repeated use, they retain their magnetic character. Ion-exchange beads of the type disclosed in this document are available from Orica Australia Pty. Ltd. under the trademark MIEX®.

WO 96/07615, the entire contents of which is incorporated herein by reference describes a process for removing DOC from water using an ion-exchange resin which then can be recycled and regenerated. This process is particularly useful in treating raw water with magnetic ion-exchange resin of the type described in WO96/07675.

The preferred ion-exchange resins disclosed in WO96/07675 are magnetic ion-exchange resins which have, throughout their structure, cationic functional groups which provide suitable sites for the adsorption of DOC. These cationic functional groups possess negatively charged counter-ions which are capable of exchanging with the negatively charged DOC. Accordingly, the negatively charged DOC is removed from the raw water through exchange with the resin's negative counter ion. As a result of this process DOC becomes bound to the magnetic ion exchange and the function of the ion-exchange resin is reduced. For producing potable water for distribution and consumption it is particularly important to be able to regenerate the spent or DOC loaded magnetic ion-exchange resin in an efficient and cost effective manner.

WO 96/07615 discloses a process for regenerating magnetic ion-exchange resin by contacting it with brine (substantially a NaCl solution). The negatively charged DOC which is bound to the resin is removed through exchange with the regenerant salt negative counter ion. The by-product of this regeneration process, referred to as the "spent regenerant", is primarily a mixture of removed DOC and excess brine. Like the waste products generated in the already discussed membrane processes the spent regenerants of this process are also disposed of to land application or discharged into the ocean.

These waste mixtures of salt and DOC are usually disposed of to land application when the water treatment is carried out in inland areas where ready access to the ocean is not available. It has been estimated that in the process described in WO96/07615, every million liters of raw water treated per day generates approximately 200-400 liters of spent regenerant depending on the raw water quality. This method for disposing of the spent regenerant can be environmentally unacceptable in many inland areas. In particular, the large concentrations of deposited NaCl which is produced as a by-product of the aforementioned processes cause degradation of soil quality. For instance, studies have attributed the high concentrations of sodium in the spent regenerant to an increase in soil salinity and water logging.

SUMMARY OF THE INVENTION

The present invention provides a process for removing DOC from a concentrated salt solution containing DOC, said process comprising;
(i) contacting the salt solution with a coagulant and/or flocculant such that the DOC becomes insoluble in the salt solution; and
(ii) removing the insoluble DOC from the salt solution.

In a second aspect of the invention provides an industrial scale process for the removal of DOC from water containing DOC, said process comprising:
(i) contacting the water with ion-exchange resin to enable adsorption of DOC on the resin;
(ii) separating the resin loaded with DOC from the water;
(iii) regenerating at least a portion of the separated resin by contacting it with a concentrated salt solution containing a source of anions such that the anions exchange with DOC adsorbed on the resin;
(iv) separating the regenerated resin from the concentrated salt solution containing DOC;
(v) contacting the solution from step (iv) with a coagulant and/or flocculant such that the DOC becomes insoluble in the salt solution; and
(vi) removing insoluble DOC from the salt solution.

In a third aspect the invention provides an industrial scale process for the removal of DOC from water containing DOC, said process comprising:
(i) contacting the water with ion-exchange resin to enable adsorption of DOC on the resin;
(ii) separating the resin loaded with DOC from the water;
(iii) regenerating at least a portion of the separated resin and recycling the remainder to step (i), wherein the resin is regenerated by contacting it with a concentrated salt solution containing a source of anions such that the anions exchange with the DOC adsorbed on the resin;
(iv) separating the regenerated resin from the concentrated salt solution containing DOC;
(v) recycling the regenerated resin back to step (i);
(vi) contacting the separated salt solution from step (iv) with a coagulant and/or flocculent such that the DOC becomes insoluble in the salt solution;
(vii) removing insoluble DOC from the salt solution to regenerate concentrated salt solution; and
(viii) recycling concentrated salt solution back to step (iii).

The process according to the second and third aspects may further include additional steps associated with ion-exchange processes for water treatment, as would be understood by a person skilled in the art.

DESCRIPTION OF PREFERRED EMBODIMENTS

Figure 1:
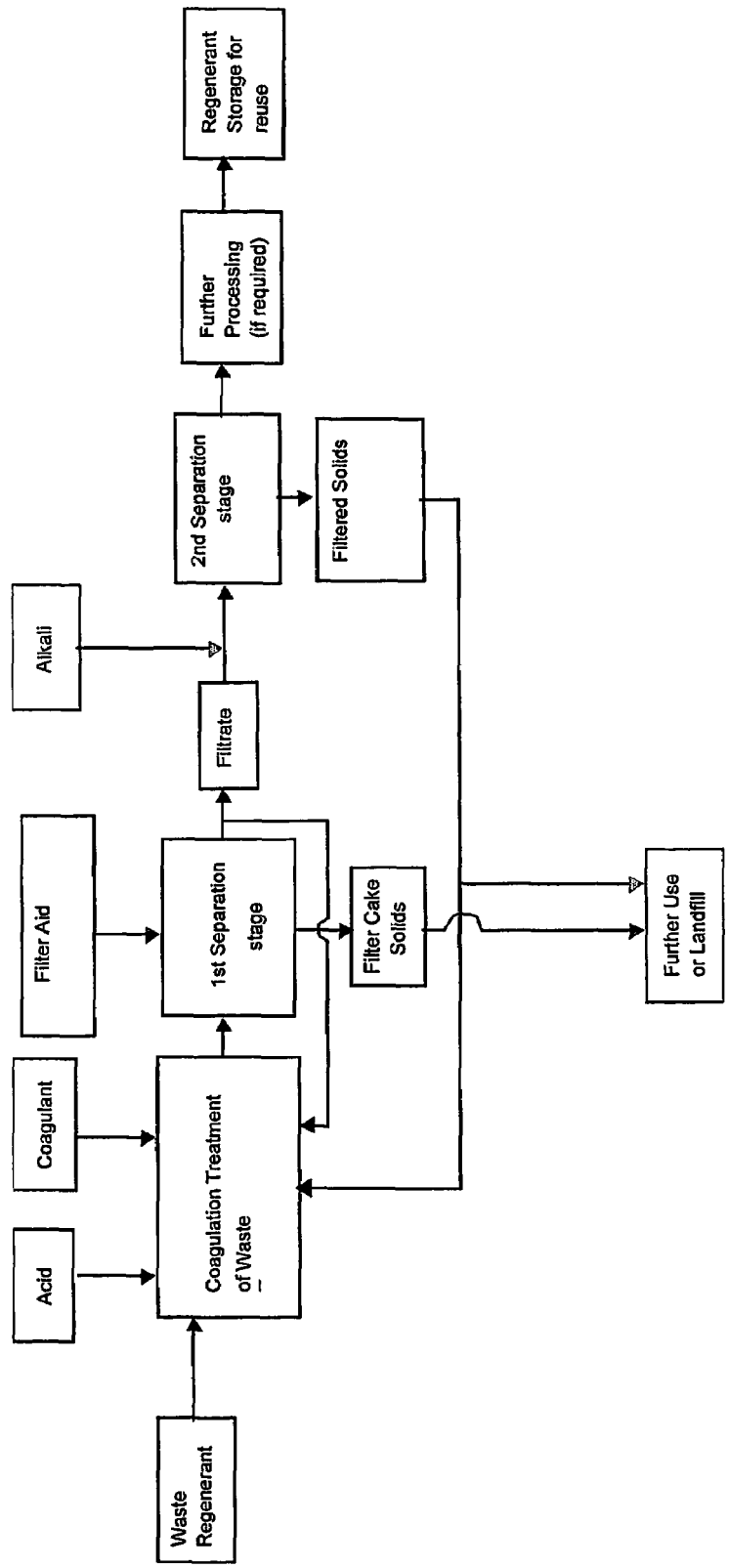
FIG. 1. A schematic diagram of a preferred process according to the present invention as applied to waste/spent regenerant.
Figure 2:
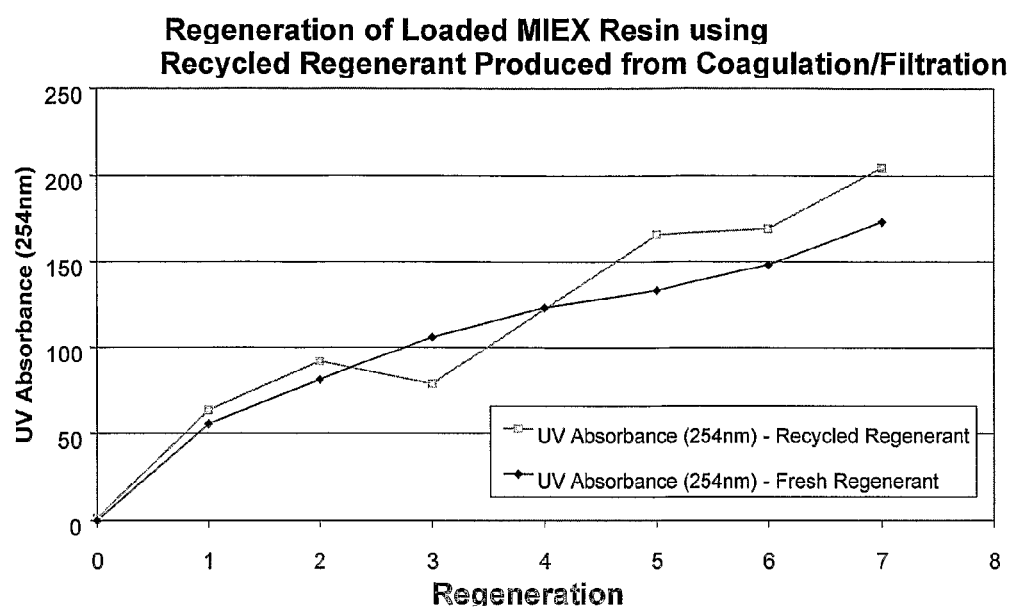
FIG. 2. A graph of data from Example 2 showing that the UV absorbance of the recycled regenerant was similar to the fresh regenerant.

The expression "a concentrated salt solution" refers to an inorganic salt solution in which the salt concentration is substantially greater than that found in raw water which is treated to produce potable water for distribution and consumption. The concentration of inorganic salt in the solution will generally be greater than 0.5M, preferably greater than 1M and most preferably greater than 1.5M. The process of the present invention for removing DOC from a concentrated salt solution containing DOC does not relate directly to the treatment of raw water containing DOC per se, but to the processing of aqueous solutions generated during the water treatment process which have undergone previous treatment to the extent that the concentration of salt in the solution is substantially greater than that of raw water. It will also be understood that such a solution will also contain a quantity of DOC as the primary objective of the process of the present invention is to remove the DOC from the solution so that the salt solution and/or DOC can be beneficially used in further processes or other applications.

One process which affords "a concentrated salt solution containing DOC" is the treatment of raw water by nanofiltration or reverse osmosis (membrane filtration techniques). However, the preferred source of a concentrated salt solution (which contains DOC) to be treated by the present process is a solution produced as a by-product from regenerating ion-exchange resins which have been previously used to remove DOC from raw water. Such solutions will be herein referred to as "spent regenerant solutions".

The regeneration of ion-exchange resins is a process in which the ion-exchange capacity of a used, or DOC loaded ion-exchange resin is returned to a level whereby it is rendered suitable for use in subsequent ion-exchange processes. Generally, the ion-exchange resins used in the removal of DOC have cationic groups which provide suitable sites for the adsorption of the DOC. These cationic groups have associated anions which exchange with the DOC during the ion-exchange process. Generally, regeneration of the spent ion-exchange resin involves the displacement (or exchange) of the adsorbed DOC, with anions. Accordingly, the term "regenerant" as used herein refers to an agent which has the capacity to increase the DOC adsorbing ability of a used ion-exchange resin by removing adsorbed DOC from the resin, and therefore free up ion-exchange sites which can bind further DOC. The preferred regenerants are concentrated inorganic salt solutions, preferably chloride salts, such as brine (which is substantially a NaCl solution), but also KCl, $NH_4Cl$ and so on. Accordingly, the by-product of this regeneration process, is the spent regenerant solution which is a concentrated salt solution containing DOC. The advantage of the process of the present invention is that upon removal of the DOC, the spent regenerant itself is effectively "regenerated" and accordingly can be used again in a further ion-exchange regeneration process. As such, the present process provides a process for regenerating and recycling the spent regenerant solutions used in regenerating DOC loaded (spent) ion-exchange resin.

The term "inorganic salt" as used herein refers to a compound formed when the hydrogen of an inorganic acid is replaced by either an alkali or alkaline earth metal or its equivalent (e.g., an $NH_4^+$ radical). Such salts are formed by the generally accepted rule that the reaction of an acid and base yields a salt and water. Preferred inorganic salts according to the process of the present invention are alkali and alkaline earth metal chloride salts. Preferred chloride salts are NaCl, KCl, $NH_4Cl$, $CaCl_2$ and $MgCl_2$. The more preferred inorganic salts are NaCl and KCl, and most preferably NaCl.

It will be understood from the present invention that the expressed "concentration" as applied to the salt solutions of the present invention depends on whether the salt solution is a solution of mixtures of salts or a solution consisting of one particular salt. An example of a solution of a mixture of salts is brine which substantially comprises NaCl but also contains small amounts of other salts. One of the most important sources of brine is from seawater. The concentrations referred to herein will be expressed in either grams (of total dissolved salt) per liter of water for solutions of mixtures of salts, or moles per liter (M) for solutions consisting of one particular salt. Seawater is generally characterized with having 35 grams of total dissolved salt per liter of water, however 35 grams of pure NaCl dissolved in a liter of water would make a NaCl solution with a concentration of 0.6M. The concentration of the "concentrated salt solutions" of the present invention will be greater than 0.5M when referring to a salt solution consisting of one particular salt and preferably greater than 1.0M and most preferably greater than 1.5M. In respect of a "concentrated salt solution" which comprises a solution of a mixture of salts, the preferred concentration is greater than 35 grams of total dissolved salt in the mixture per liter of water, also expressed as 35% w/v with respect to the total dissolved salts present. More preferably the concentration of salt(s) is greater than 50 g/l, more preferably greater than 100 g/l.

According to the process of the present invention the DOC is removed from a concentrated salt solution by contacting the solution with a coagulant and/or flocculent in any convenient way which allows DOC to become insoluble in the salt solution. The salt solution is preferably contacted with the coagulant and/or flocculant in a way which allows the later recovery of the solution. The coagulant and/or flocculant is preferably added to the salt solution and dispersed for a time and under conditions sufficient to allow coagulation or flocculation of the DOC to occur. In practice this will generally be achieved by adding the coagulant and/or flocculant to the concentrated salt solution in an amount which will be sufficient to coagulate a substantial amount of the DOC in the solution. The amount required will depend on the nature of the coagulant/flocculant used. The mixing of the coagulant and/or flocculant with the concentrated salt solution is preferably conducted in a mixing tank or pipeline with a preferred coagulant mixing time of between 5 to 30 minutes.

The term "coagulant" as used herein refers to any chemical agent which, when added to water that has suspended and colloidal solids, can destabilise such solids to form aggregates which can be subsequently removed by sedimentation, filtration or both. In such a process depending upon the amount of coagulant used, the DOC also reacts with the coagulant to form an insoluble aggregate. Coagulation can be considered to be a process of destabilising charges on particles in water by adding chemicals (coagulants) to form insoluble aggregates. Natural particles in water generally have negative charges that repel other material and thereby keep them in suspension. In coagulation, positively charged chemicals are added to neutralise or destabilise these charges and allow the particles to accumulate and be removed by physical processes. With specific reference to the removal of DOC, the coagulation process can be enhanced at lower pH where DOC can become insoluble in water. Such a process can be facilitated by either using acidic coagulants (for example Ferric chloride) or through the addition of acids during coagulation, or by using a combination of the two. The preferred pH for conducting the coagulation step is a pH of less than 3.

The term "flocculant" as used herein refers to any water soluble, organic polyelectrolytic chemical agent that is used alone or in conjunction with coagulants, such as aluminum or iron salts, to agglomerate solids present in water. This process initially forms smaller agglomerates known as microfloc, and later more bulky floccules. In relation to the removal of DOC from water the flocculant is generally used in conjunction with the coagulant to aid in the agglomeration of DOC which has become insoluble as mentioned above.

Coagulants/flocculants that can be used in the present invention include: aluminum sulphate (alum), polyaluminium chloride, aluminum chlorohydrate, polyaluminium chlorohydrate, ferric chloride, ferric sulphate, polymerised ferric sulfate, polyDADMACS, polyacrylamide emulsion polymers, coagulant aids, filter aids and the like.

Preferred flocculants/coagulants which can be used in the process of the present invention include: Ferric chloride, Ferric sulphate, polymerised Ferric sulphate and Aluminum sulphate (Alum).

It will be understood, however, that the choice of flocculant and/or coagulant to be used in the present process from removing DOC from a concentrated salt solution according to the present invention depends on commercial considerations. In particular, a person skilled in the art would understand the importance of choosing the appropriate reagent in order to achieve the best desired performance at the lowest possible cost. Accordingly, the process of the present invention embraces all effective flocculants and coagulants known in the art, as well as the use of mixtures thereof.

As briefly mentioned previously the coagulation process may also be enhanced by the addition of an acid (or mixtures thereof) to lower the pH of the concentrated salt solution containing the DOC. The lowering of the pH in this way may serve to enhance the coagulation step by decreasing the solubility of particular DOC's, such as humic and fulvic acids, which can become insoluble at pH values of less than 3. Preferably, when an acid is added to enhance the coagulation step the pH of the solution is reduced to around 2. The preferred acids for this purpose are HCl, $HNO_3$ and $H_2SO_4$. The most preferred acid is HCl.

After the salt solution has been treated with the flocculant and/or coagulant to form a DOC aggregate, the DOC aggregate is removed from the regenerant. Methods for removing aggregates from water are known to those skilled in the art and can be used in the present process. For example, the aggregate can be physically removed by methods such as floating, settling, a belt press, or with the use of thickeners, as well as filtration methods including, microfiltration, vacuum filtration, pressure filtration, ultrafiltration, centrifuges, hydrocyclones and the like.

A preferred method of removing the DOC aggregate from the salt solution by the process of the present invention is a filtration method.

One of the filtration methods which may be used in the present invention is microfiltration. Microfiltration involves passing a liquid through a fiber which has a particular pore size. Microfilters generally have a pore size of 0.2 microns. Pressure is exerted unto the liquid to force it through the membrane. There are three generally main configurations for microfiltration used in water treatment systems:

Crossflow microfiltration—water is pumped into the inside of the fibre and pressure forces it through the membrane. In this case water is pumped around the system at high speed, thus creating a high flow along each fibre.

Direct (Dead End) Microfiltration—water is pumped directly onto the membrane. Pressure forces water from the inside of the membrane, to the outside.

Submerged microfiltration—fibre bundles hang freely in a tank of raw water and the suction on the inside of the fibres pulls water from the outside of the fibres to the inside of membrane.

It will be understood that the term "microfiltration" as used herein encompasses all of the above microfiltration systems, and that all these microfiltration devices may be used to separate the coagulated DOC from the salt solution in the process of the present invention.

More preferably the coagulated flocs are removed by a plate and frame filter press. The press may be equipped with a membrane for squeezing the filter cake and removing more water from the filter cake.

The separation method for removal of the coagulated DOC may consist of any of the above methods as a single step or in combination. For instance a thickener may be used to increase the solids content before passing the thickened solids through a plate and frame filter press. Should any additional processing be required by a particular separation technique this should be included. For example, when using a filter press, a filter aid such as diatomaceous earth may be used to aid the processing or with microfiltration, a coarse filter may be installed in front of the microfilter. A provision for recycling some or all of the treated brine back to the coagulation tank may be included, as some separation techniques may require this during the initial processing of a batch.

The ion-exchange resins which are regenerated to produce the spent regenerant which can be subject to the process of the present invention are those which have been previously used in a water treatment plant to remove DOC from water. The water treatment plant may be a plant for producing potable water for distribution and consumption, or may be a plant for the treatment of sewage, or industrial waste water containing DOC. The industrial water treatment plant may be associated with food processing, pharmaceutical production, electronic component manufacture, membrane plant reject, hospital applications and the like. As will become evident one of the main advantages of the process of the present invention is that the removal of DOC from the spent regenerant means that the product salt solution can be used again (recycled) to regenerate further DOC bound ion-exchange resins. Accordingly the present invention will find use in any large scale water treatment facility. It is particularly preferred for use in the treatment of a raw water source to produce potable water for distribution and consumption.

In current processes for regenerating ion-exchange resins the used or spent ion-exchange resin may be contacted with the regenerant in any convenient way which allows the anions to exchange with DOC adsorbed on the resin, for example, using a process similar to that described in WO96/07615 wherein the regenerant is brine. In such a process chloride ions exchange with the DOC adsorbed on the resin.

Preferably the regenerant is contacted with the ion-exchange resin in a way which allows the recovery of the regenerated ion-exchange resin from the regenerant. In a typical process the regenerant is added to the used resin and dispersed for a time and under conditions sufficient to allow desorption of the DOC from the resin. The resin may be dispersed in the regenerant by any convenient means, preferably with agitation by mechanical stirring or gas bubble agitation.

Separation of the resin from the regenerant can be achieved by allowing the resin to settle or by filtering through a mesh of appropriate porosity.

An alternative process for contacting the used resin with the regenerant involves packing the resin into a column and passing the regenerant through a column. It has been found that such a process generally requires less regenerant than the process described above and is particularly suitable for the resin described in WO96/07675 due to its structure. This process also enables high rates of desorption of DOC from the resin and improves the recyclability of the resin.

The preferred resin for the regenerant recycling process of the present invention is magnetic ion-exchange resin, such as the resin disclosed in WO96/07675. This ion-exchange resin contains magnetic particles which can agglomerate due to the attractive magnetic forces between them. This process is sometimes referred to as "magnetic flocculation". This property renders the resin particularly suited to this application as the agglomerated particles are more readily removable from the regenerant. In dispersing the magnetic ion-exchange resin in the regenerant, it is important that sufficient shear is applied to overcome the magnetic attractive forces which cause agglomeration. Agglomeration of the resin is achieved by removing the shear causing the resin particles to disperse. The magnetic ion-exchange resin is more dense than the regenerant such that it has a tendency to settle quickly to the bottom of the regeneration tank. This also facilitates the separation of the resin from the regenerant.

The resin may be collected by various means including vacuum collection, filtration, magnetic transport such as belts, pipes, dishes, drums, pumps and the like. Preferably the resin is separated from the regenerant by either vacuum filtration of the regenerant through a filter cloth or mesh of appropriate porosity, or by decanting off the regenerant sitting on top of the settled resin or a combination of both. Preferably the separation and collection means do not cause undue mechanical wear which may lead to alteration of the resin. It is also possible to regenerate the magnetic resin by packing it into a column as described above. These regeneration processes are usually performed in a batch manner. However, continuous processes for regeneration of the ion-exchange resin are also possible with the use of belts, drums, pumps, magnetic transport and the like.

The spent regenerant which is to be subjected to the process of the present invention can be separated by decanting it from the resin. After decanting off excess spent regenerant, the spent regenerant that is sitting with the resin can be removed by a vacuum filtration process through a filter cloth or screen positioned at the bottom of the tank. This leaves a dry resin sitting in the reaction tank.

The expressions "regenerated concentrated salt solution" and "regenerated regenerant" as they apply to the regenerant, refers to a regenerant which has been used in an ion-exchange regeneration process to regenerate the ion exchange resin and has subsequently had DOC removed from it by subjecting it to the process of the present invention. It is not necessary for all DOC from the spent regenerant to be removed to consider the regenerant "regenerated". It is sufficient that enough DOC has been removed from the spent regenerant so that the regenerant can be used in a subsequent regeneration process. Preferably more than 80% of the DOC is removed from the spent regenerant, more preferably greater than 90%, and most preferably greater than 95%.

The spent regenerant may be stored and treated on site or transferred off site to be treated by the process of the present invention. If the regenerant is to be regenerated on site, it is preferred that the ion-exchange regeneration system and the regenerant regeneration system are connected in such a way as to allow the spent regenerant to be fed into the regenerant regeneration system and for the regenerated regenerant to be transported back (recycled) into the ion-exchange regeneration system. This system can be adapted for use in either a batch or continuous process for large scale water treatment which uses ion-exchange resin and is a further advantage of the present invention.

Before using the regenerated regenerants which have been treated according to the process of the present invention, the regenerant pH may need to be adjusted. For example, if the pH of the spent regenerant was adjusted during the coagulation step the pH may have dropped to around 2. The optimal pH of a regenerant solution for use in regenerating ion-exchange resins is 7-11. Accordingly, bases, such as sodium hydroxide, magnesium hydroxide and the like, may be used to adjust the pH of the regenerated regenerant before being recycled to regenerate further quantities of DOC-loaded resin.

Upon readjustment of the pH up to 7-11, some materials may precipitate out of solution. Accordingly it may be necessary for a second stage separation method to be employed to remove the formed precipitate. Any of the separation methods described earlier may be used.

A further separation process/technique may be required to remove other contaminants that have not been taken out during the earlier processing. For example excess sulphate may be removed from the brine at this stage using lime softening. It may be found that other dissolved contaminants require removal before recycling of the regenerated regenerant using other processes. For example, processes using granular activated carbon or powdered activated carbon may be required to "mop up" residual contaminants.

The solid and/or slurry generated by this second separation stage and subsequent processing may be sent back to the head of the waste treatment process or combined with the solid and/or slurry from the initial separation phase or sent to landfill for disposal.

The regenerated regenerant may be used straightaway or sent to storage before it is recycled in a further regeneration process. The continued use (recycling) of the regenerant in conjunction with the regeneration of ion-exchange resins is a major advantage of the process of the present invention. Before recycling the regenerated regenerant it may be sent to a salt saturator to increase the salt concentration. It may also be sent back to various tanks or vessels utilized throughout the regeneration process, such as a tank for storing regenerant prior to use or directly to a vessel in which resin is regenerated.

The process of the present invention may be readily incorporated into existing water treatment facilities which utilise ion-exchange resins together with processes for regenerating such ion-exchange resins.

For example, ion-exchange processes in water treatment may be used in conjunction with membrane filtration techniques where the ion-exchange resins have been incorporated to improve the effectiveness of the membranes, increase the flux across membranes and reduce operating costs. When this is done in conjunction with a process for regenerating the ion-exchange resin, the present process of recycling the spent regenerant can easily be incorporated. For new installations where existing membrane filtration techniques have been replaced with ion-exchange techniques, the process of the present invention can be incorporated along with processes for regenerating ion-exchange resins.

Examples of water treatment processes involving ion-exchange and ion-exchange regeneration from such a process, have been disclosed in WO96/07615, and the present process for recycling the regenerant can be readily incorporated into these processes.

Many industrial processes rely on ion exchange to produce high quality water. These include, but are not limited to, softening (i.e. all salts transformed into sodium salts), demineralisation (removing compounds such as $Ca(HCO_3)_2$, $Mg(HCO_3)_2$, $CaSO_4$, $MgSO_4$ etc.), as well as nitrate, chromate and uranium removal. These waters can then be used in many wide ranging applications such as boiler feedwater, potable water, as high quality process water for the pharmaceutical manufacture, electronic component manufacture and the chemical industry. In order for conventional ion-exchange to be used (i.e. passing water through column of resin) it is necessary that the water being treated be relatively free of particulate matter in order to prevent plugging of the ion exchange bed. Pretreatment using sedimentation, coagulation and filtration may be necessary.

At the present time there is very little use of ion-exchange in processes for producing potable water for distribution and consumption, due mainly to the inherent problems in treating such large volumes of water with ion-exchange resin. However, the magnetic ion-exchange resin disclosed in WO96/07675 has proved particularly successful in the treatment of such large volumes of water.

In processes involving such an ion-exchange resin the raw water is generally fed into a continuously stirred tank (contactor) which has a nominal residence time usually of between about 5 and 60 minutes. The magnetic ion-exchange resin is added either directly into this tank or into the raw water in the pipeline feeding this tank. It is in this tank that the majority of the ion-exchange process occurs. Prior to treatment with the ion-exchange resin the water will generally have been screened to remove large particles to protect pumps involved in pumping the water to the treatment plant. It is also possible that the water will have been subjected to one or more pretreatment steps, such as coagulation/flocculation and subsequent clarification.

From the contactor, the resin and water (resin suspension) is generally passed to a separating stage (settler) where the resin is recovered and recycled. Depending on the density of the resin it may be possible to recover it using gravity sedimentation. Magnetic ion-exchange resins have a strong tendency to agglomerate to form large and fast settling particles when shear is removed (as occurs in the settler). The agglomerated resin particles settle rapidly and are collected on the bottom of the settler where they may be transferred (e.g. by pumping) back to the head of the treatment plant for reuse in the process. At least a portion (and generally a small portion) of the flow which is to be recycled back to the head of the plant is removed and subjected to the regeneration process. To keep the resin concentration at the required level, fresh or regenerated resin is added to the contactor to make up for the resin not being returned. This ensures the performance of the process is maintained. The resin, after it has been regenerated, may be sent to a "fresh" resin tank before it is added back into the process to make up for resin being sent for regeneration.

One of the advantages of the process of the present invention is that it can be incorporated in such water treatment facilities and can be used in conjunction with the ion-exchange regeneration process to form a continuous process of ion-exchange and regenerant regeneration and recycling.

With processes involving the use of MIEX® resin, pre-treatment is not usually required to remove solids and turbidity from the water, although the raw water may be screened to remove large particulate matter before it is introduced into a water treatment process.

After separation of the ion-exchange resin from the water it is usual to subject the water to further processing before it is suitable for distribution and consumption. The water may be subjected to a coagulation/flocculation step followed by clarification. This may be done in a gravity settler. The water may also be subjected to one or more of the filtration steps described above, as well as disinfection. The disinfectant may be added at any stage during the water treatment process. Usually however, disinfectants are added during or at the end of the treatment process such that there is residual disinfectant present in the water supplied to the consumer. This is known as secondary disinfection and most commonly involves the use of chlorine, chloroamines and chlorine dioxide. However, in order to achieve disinfection of water, ozone, potassium permanganate, peroxone, UV radiation and combinations of the above, can also be used as primary disinfectants.

The water treatment process may also be used in conjunction with other unit processes such as ozonation and treatment using granular activated carbon (GAC). These optional features may be incorporated at any suitable stage during the water treatment process, as would be appreciated by a person skilled in the art.

The regenerant regeneration process of the present invention can be readily incorporated into an existing water treatment facility which involves the use of ion-exchange resins and utilised in any of the process combinations described above which includes a resin regeneration process.

It has been recognised that the above ion-exchange processes used in the production of potable water can become more cost effective and efficient if the ion-exchange resin can be used multiple times by regenerating the ion-exchange resin. However, the large amount of spent regenerant produced as a waste by-product of such processes is problematic. In order to reduce the amount of regenerant wastage, the process of the present invention provides a chemically efficient recycling process that can be used in conjunction with the above ion-exchange water treatment methods where an ion-exchange resin regeneration process has been installed.

Furthermore, the regenerant recycling processes of the present invention may be utilised where an ion-exchange process and a process for regenerating the ion-exchange resin has been incorporated prior to or instead of coagulant addition. Typically, coagulants such as alum (aluminum sulphate), iron salts and synthetic polymers are used following the ion-exchange step. The removal of DOC by ion-exchange results is a substantial reduction in the quantity of coagulant required at this stage in the process. In addition, the removal of DOC reduces the requirement for subsequent chemical additions and improves the efficiency and/or rate of coagulation, sedimentation and disinfection. This has a beneficial impact on the water quality produced and the size of most facilities required within the water treatment plant including sludge handling facilities.

The regenerant recycling process of the present invention can also be conveniently adapted for use in continuous ion-exchange water treatment processes that presently use brine as a regenerant.

The continuous process differs significantly from the conventional ion-exchange process. In conventional ion-exchange columns, the water quality produced deteriorates as the ion-exchange capacity is progressively exhausted. The leakage of undesired ions eventually reaches the point where the product water is not potable. In such an instance, the column must be taken off-line and the resin regenerated.

In contrast to this, a continuous process differs in that the overall ion-exchange capacity is continuously maintained. This leads to the production of water with consistent quality as well as the DOC being controlled at predetermined levels. The ability to maintain the quality of water in such processes stems directly from the incorporation of resin recycling and regeneration steps. Such processes usually incorporate a means for removing and recycling the resin to the front end of this process. However, a small amount of the recycled resin is usually removed to be regenerated. The regenerated resin from the regeneration process is subsequently added to the front end of the process. The present invention can be incorporated into such continuous processes.

Apart from the benefit of reusing the concentrated salt solution after subjecting it to the process of the present invention, the removed DOC itself can be beneficially used. For instance, further processing of the DOC bound aggregate derived from the spent regenerant is expected to be a valuable source of concentrated amounts of DOC. Alternatively, treating raw water in a membrane filtration process will produce a concentrated DOC/salt mixture. Accordingly, subjecting this mixture to the process of the present invention will afford a concentrated DOC aggregate. The aggregate formed by adding a coagulant and/or flocculent to the spent regenerant predominantly consists of DOC, some iron and low levels of the salt used in regeneration process. The aggregate can then be treated to produce a solid cake, or a slurry depending on the water content. This in effect increases the solids content of DOC, and may involve the single use or combination of the same separation techniques which have been mentioned earlier. The cake or slurry may be "washed" by water (it can be washed in the filtration equipment) to remove any excess salt. For instance a plate and frame filter press allows for a water wash of the filter cake. The cake or slurry produced by such a process predominately contains DOC. Accordingly, another advantage provided by the process of the present invention is the production of a DOC concentrate, or DOC concentrate which can be further processed, which may be used beneficially in other industries (such as the agricultural and pharmaceutical industries) as products such as a fertiliser, a component of a balanced fertiliser, feedstock, soil conditioners or even health supplements. It has been suggested that fulvic acids (a DOC) may find value as a medicament, in particular, as an antioxidant or to increase the functioning of the immune system. Accordingly, apart from providing a means to recycle an ion-exchange regenerant, the present invention may also provide products which are useful in themselves, or which can be further processed to provide pharmaceutically or agriculturally beneficial compounds.

Furthermore these DOC concentrates also provide an environmentally friendly alternative when disposed of as land fill when compared to the present practice of dumping waste regenerant solutions or by-products from membrane filtration processes.

The invention will now be further described with reference to the drawings and the following non-limiting example. However, it is to be understood that the particularity of the following description of the invention is not to supercede the generality of the preceding description of the invention.

Referring to FIG. 1 there is set out a diagnostic representation of a process for regenerating regenerant according to the present invention. In the process shown acid is added with a coagulant to precipitate the coagulation of the DOC following separation of the coagulated DOC, the filtrate is treated with alkali which precipitates further material, including some unused coagulant. This precipitate is removed to provide recycled regenerant.

EXAMPLES

Example 1

Waste Regenerant Sample:

Waste or spent regenerant from a water treatment plant in Australia was used in this example. Some key constituents of the waste brine were analyzed for their concentrations as shown below:

Chloride: 53,000 mg/L
Sulfate: 3,300 mg/L
Dissolved Organic Carbon (DOC): 5,200 mg/L To 200 mL of the spent regenerant in a sealable bottle, was added a pre-determined dosage of $FeCl_3$. The bottle was shaken for 15-30 minutes. The resulting aggregate was filtered through a 0.45 μm filter using a vacuum filtration device. The filtrate was collected and analyzed for DOC. The results are illustrated in Table 3.

TABLE 3

| $FeCl_3$ coagulation followed by microfiltration (0.45 μm) | | | |
|---|---|---|---|
| Dosage (mg/L as Fe) | 350 | 700 | 1000 |
| Final pH | 5.5 | 4.5 | 3.7 |
| Residual DOC (mg/L) | 3680 | 2020 | 920 |
| % DOC Removal | 29 | 61 | 82 |
| g DOC removed/g Fe | 4.3 | 4.5 | 4.3 |

Example 2

Trial procedure: The fresh and recycled regenerant were used to regenerate a batch of resin. The UV absorbance was then measured. Salt content and pH adjustment were then performed on the two regenerants and the regeneration process repeated on the MIEX resin. This whole process repeated for 7 regenerations. The graph depicted in Fig .2 shows that the UV absorbance of the recycled regenerant was similar to the fresh regenerant. (Note that UV absorbance is a surrogate measure for DOC)

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. It is to be understood that the invention includes all such variations and modifications which fall within the spirit and scope. The invention also includes all of the steps, features, compositions and compounds referred to or indicated in this specification, individually or collectively, and any and all combinations of any two or more of said steps or features.

The claims defining the invention are as follows:

1. A process for the removal of DOC from water containing DOC, said process comprising:
    (i) contacting the water with ion-exchange resin to enable adsorption of DOC on the resin;
    (ii) separating the resin loaded with DOC from the water;
    (iii) regenerating at least a portion of the separated resin by contacting it with a concentrated inorganic salt solution containing a source of anions such that the anions exchange with DOC adsorbed on the resin;
    (iv) separating the regenerated resin from the concentrated salt solution containing DOC;
    (v) contacting the solution from step (iv) with a coagulant and/or flocculant such that the DOC becomes insoluble in the salt solution; and
    (vi) removing the insoluble DOC of step (v) from the salt solution.

2. A process according to claim 1 wherein the ion exchange resin has a density greater than the water and the resin loaded with DOC is separated from the water by settling.

3. A process according to claim 2 wherein the resin is collected by vacuum collection.

4. A process according to claim 1 wherein the regenerated resin is separated from the concentrated salt solution containing DOC by filtering through a mesh.

5. A process for the removal of DOC from water containing DOC, said process comprising:
    (i) contacting the water with ion-exchange resin to enable adsorption of DOC on the resin;
    (ii) separating the resin loaded with DOC from the water;
    (iii) regenerating at least a portion of the separated resin and recycling the remainder to step (i), wherein the resin is regenerated by contacting it with a concentrated inorganic salt solution containing a source of anions such that the anions exchange with the DOC adsorbed on the resin;
    (iv) separating the regenerated resin from the concentrated inorganic salt solution containing DOC;
    (v) recycling the regenerated resin back to step (i);
    (vi) contacting the separated inorganic salt solution from step (iv) with a coagulant and/or flocculant such that the DOC becomes insoluble in the salt solution;
    (vii) removing insoluble DOC from the salt solution to regenerate concentrated inorganic salt solution; and
    (viii) recycling concentrated inorganic salt solution back to step (iii).

6. A process according to claim 1 which is used in the treatment of a raw water source to produce potable water for distribution and consumption.

7. A process according to claim 5 wherein the regenerated salt solution obtained from step (vii) is treated with a base.

8. A process according to claim 5 wherein the regenerated concentrated salt solution is obtained from step (vii) has a PH of 7-II.

9. A process according to claim 1 wherein the ion-exchange resin is magnetic ion-exchange resin.

10. A process according to claim 9 wherein the magnetic ion-exchange is MIEX® resin.

11. A process according to claim 1 wherein the coagulant/flocculant is selected from aluminum sulphate (alum), polyaluminum chloride, aluminum chlorohydrate, polyaluminium chlorohydrate, ferric chloride, ferric sulphate, polymerised ferric sulphate, polyDADMACS, polyacrylamide emulsion polymers, coagulant aids, and filter aids.

12. A process according to claim 11 wherein the coagulant/flocculant is selected from Ferric Chloride, Ferric Sulphate, polymerised Ferric sulphate and Aluminum sulphate (Alum).

13. A process according to claim 1 wherein the concentrated salt solution is a concentrated inorganic salt solution selected from NaCl, KCl, $NH_4Cl$, $CaCl_2$ and $MgCl_2$ or mixtures thereof.

14. A process according to claim 13 wherein the concentrated salt solution is a brine solution.

15. A process according to claim 13 wherein the salt solution has a concentration of greater than 1.5 M, or 100 grams of total dissolved salt in a mixture of salts per litre of water.

16. A process according to claim 1 wherein the step of contacting the salt solution with a coagulant and/or flocculant is conducted under acidic conditions.

17. A process according to claim 16 wherein the pH is less than 3.

18. A process according claim 1 wherein the step of contacting the salt solution with a coagulant and/or flocculant further includes the addition of an acid.

19. A process according to claim 18 wherein the acid is selected from HCl, $HNO_3$ and $H_2SO_4$.

20. A process according to claim 19 wherein the acid is HCl.

21. A process according to claim 18 wherein the pH is about 2.

22. A process according to claim 1 wherein the insoluble DOC is removed from the salt solution by filtration.

23. A process according to claim 22 wherein the filtration method is a plate and frame filter process.

24. A process according to claim 1 wherein the DOC which is removed from the salt solution is used as a fertilizer, feedstock, soil conditioner, or health supplement.

25. A process according to claim 1 wherein the DOC which is removed from the salt solution is used as land fill.

* * * * *